United States Patent [19]

Harvey

[11] Patent Number: 4,973,997

[45] Date of Patent: Nov. 27, 1990

[54] TELE/PAN APPLIED TO LOWEST COST CAMERA USES PASSIVE OPTICAL ENCODING

[75] Inventor: Donald M. Harvey, Webster, N.Y.

[73] Assignee: Eastman Kodak Company, Rochester, N.Y.

[21] Appl. No.: 465,829

[22] Filed: Jan. 16, 1990

[51] Int. Cl.[5] .............................................. G03B 17/24
[52] U.S. Cl. ..................................... 354/106; 354/222
[58] Field of Search ............... 354/105, 106, 107, 108, 354/109, 222; 355/40

[56] References Cited

U.S. PATENT DOCUMENTS

| | | | |
|---|---|---|---|
| 1,481,272 | 1/1924 | Robertson et al. .................. | 354/107 |
| 1,848,814 | 3/1932 | Allen .................................... | 354/106 |
| 3,490,844 | 1/1970 | Sapp ..................................... | 355/40 |
| 3,552,283 | 1/1971 | Babcock et al. ..................... | 354/106 |
| 4,357,102 | 11/1982 | Taren et al. ......................... | 355/77 |
| 4,583,831 | 4/1986 | Harvey ................................. | 354/106 |
| 4,650,304 | 3/1987 | Harvey ................................. | 354/21 |
| 4,833,493 | 5/1989 | Lamar .................................. | 354/107 |
| 4,926,203 | 5/1990 | Hata et al. ........................... | 354/106 |

Primary Examiner—A. A. Mathews
Attorney, Agent, or Firm—Roger A. Fields

[57] ABSTRACT

Camera with adjustable viewfinder mask having differently dimensioned openings for pseudo-photography, has light pipes to provide binary coding of film frames corresponding to mask positions.

6 Claims, 3 Drawing Sheets

TELE/PAN APPLIED TO LOWEST COST CAMERA USES PASSIVE OPTICAL ENCODING

BACKGROUND OF THE INVENTION

1. Field of the Invention

This invention relates to a photographic camera for enabling pseudo tele-photo and/or pseudo panoramic prints to be produced. Each exposure is coded to identify a selected pseudo format, or a full-frame non-pseudo (normal) photograph. The invention is directed primarily to an extremely low cost construction for achieving such photography.

Pseudo photography involves masking the viewfinder of a camera so that the user of the camera sees the particular picture which he wants printed, whether it be full frame (normal), telephoto or panoramic in nature, the latter being of course a type of pseudo wide angle photography. By suitably identifying on the film with respect to each exposure frame, the particular viewfinder mask used in the exposure, the printer can determine how to mask the print or how to mask the negative when printing from the negative.

2. Description of the Prior Art

Pertinent prior art patents are U.S. 3,490,844, granted Jan. 20, 1970 and 4,357,102, granted Nov. 2, 1982. These patents discuss the general subject of pseudo photography. However, to the extent that they describe camera structure, they are directed to more sophisticated and expensive constructions than the present invention. The present invention is directed to providing a very low cost construction such as might be used in disposable camera.

SUMMARY OF THE INVENTION

According to the invention, light pipes are provided for directing ambient light from outside the camera to a selected fiducial area of the film adjacent the respective exposure frames. According to a preferred embodiment two light pipes provide a binary code on the film so as indicate which of three viewfinder apertures was used at the time of the exposure frame. The construction is simplified by providing the viewfinder framing apertures in a movable plate which has an extension of variable width such that in one position, neither light pipe is blocked, in another position one of the light pipes is blocked, and in a third position both light pipes are blocked.

BRIEF DESCRIPTION OF THE DRAWINGS

The invention will be described in connection with a preferred embodiment as shown in the drawings, wherein.

DESCRIPTION OF THE PREFERRED EMBODIMENT

Figure 1:
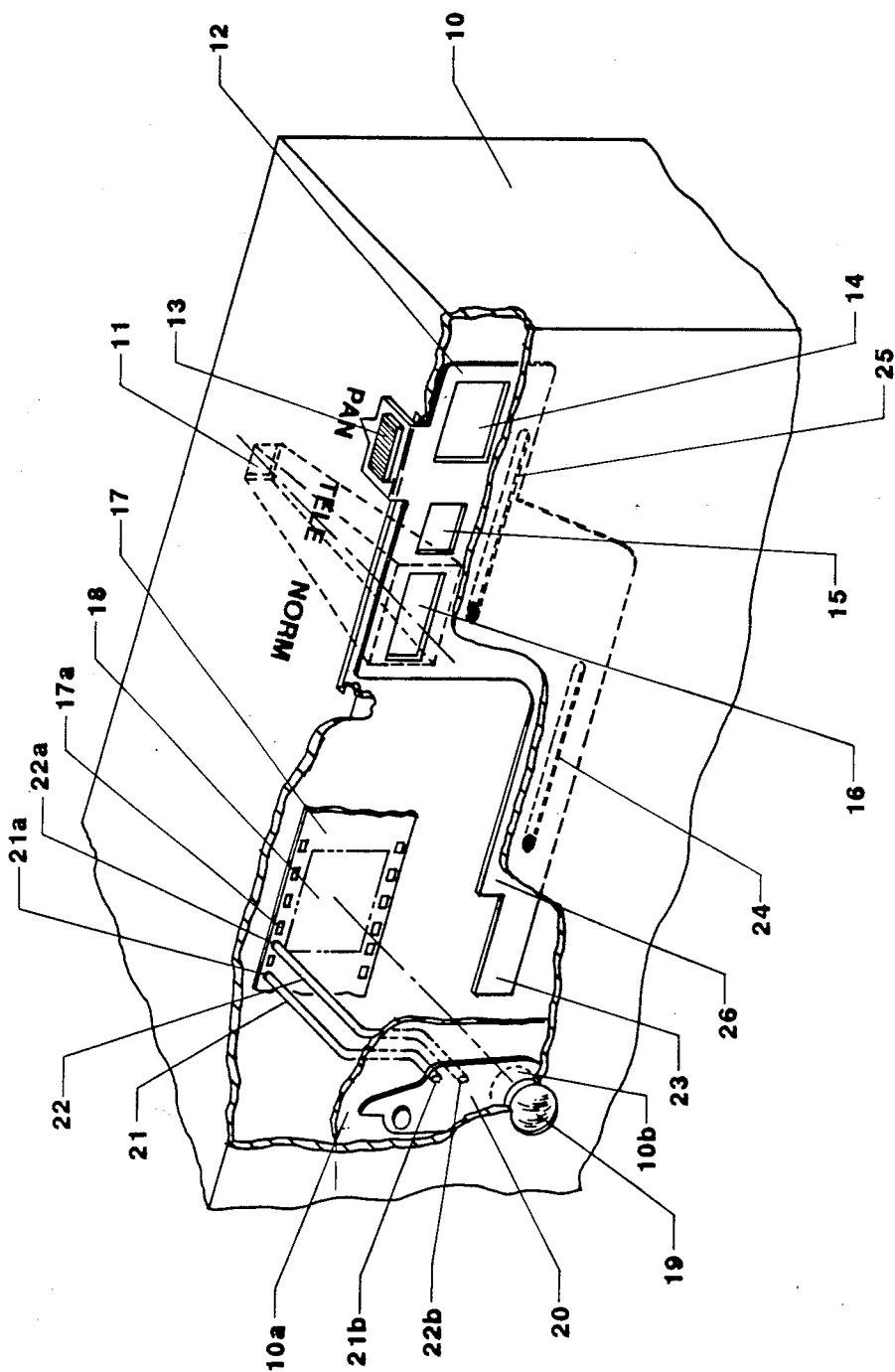
FIG. 1 is a perspective view, partly diagrammatic, and with parts broken away to show the essential elements of the invention.

In FIG. 1 a camera body is shown at 10 with a viewfinder 11 and a sliding plate 12 which is moved by a user finger engaging part as shown at 13. Masking openings 14, 15 and 16 are shown in the mask plate, opening 14 being for full frame (normal) image, opening 15 being for pseudo tele and opening 16 being for pseudo panoramic.

A portion of a filmstrip is shown at 17 and an exposure area in the film is illustrated at 18. A taking lens is shown at 19 and a pivoted shutter element is shown at 20. Two light pipes are shown at 21 and 22, respectively, comprising means for directing ambient light to selected fiducial areas of the film.

Light pipes 21 and 22 terminate at their rear ends 21a and 22a, respectively, adjacent to the fiducial areas of film 17. As shown, these fiducial areas are located in an edge area between successive sprocket holes of the film, some of which are shown at 17a, and outside the image exposure area in predetermined, standardized positions with regard to each related exposure area 18.

Figure 2:
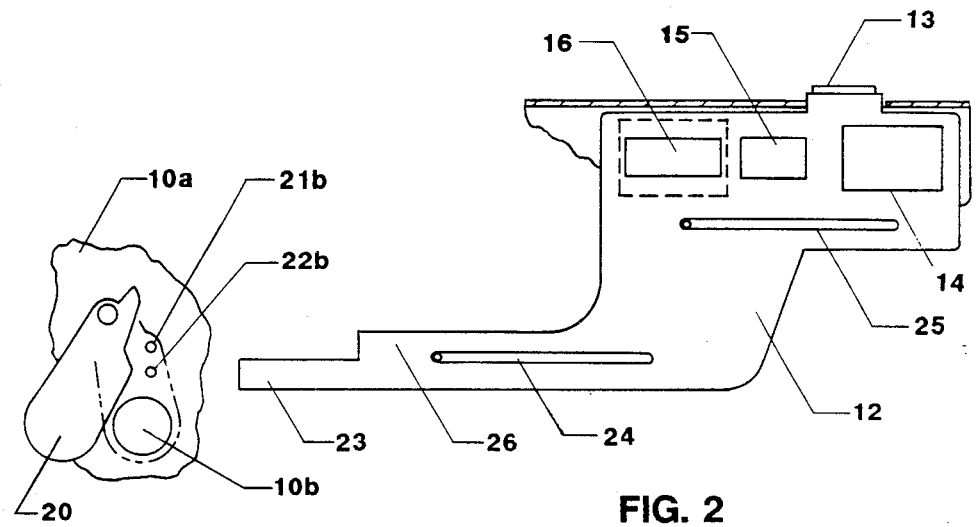
FIGS. 2-4 show various positions of the masking element for the viewfinder, FIG. 2 showing the position for a panoramic masking in which neither light pipe is blocked, FIG. 3 showing a position for pseudo tele masking in which one light pipe is blocked, and FIG. 4 showing the position for full frame (normal) masking in which both light pipes are blocked.
Figure 3:
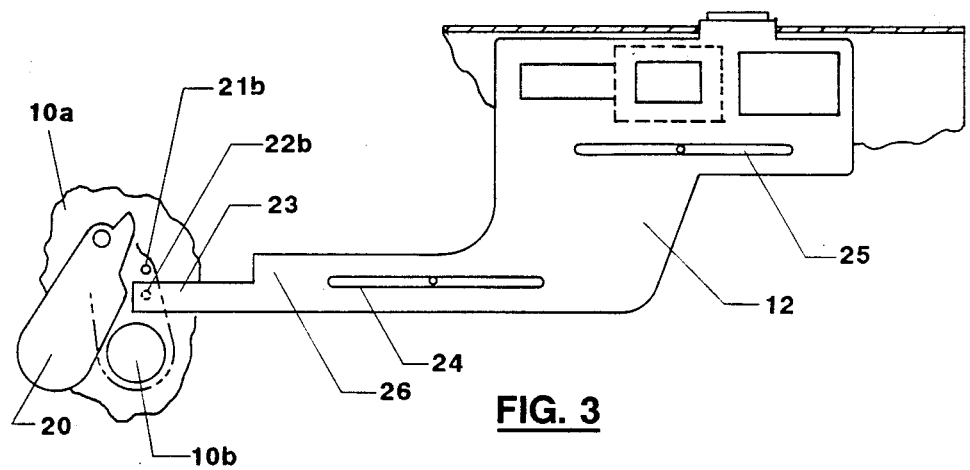
Figure 4:
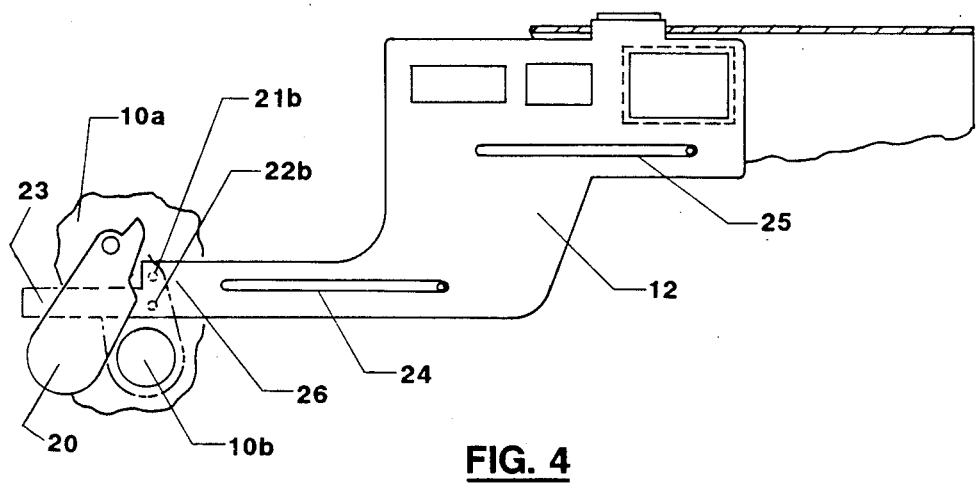

At their front ends light pipes 21 and 22 terminate at a pair of openings 21b and 22b in a wall 10a which is positioned within the camera along the path of scene light entering the camera. Wall 10a has an opening 10b aligned with the optical axis and through which scene light passes to the film when shutter element 20 is in the open, film exposing position in which it is shown in FIGS. 2-4. Shutter element 20 blocks passage of ambient light to said light pipes except when the shutter is opened for an image exposure. Openings 21b and 22b are positioned relative to opening 20a so that when the shutter element 20 opens for an exposure, enough scene ambient light strikes the front ends of light pipes 21 and 22 to create a latent image at the fiducial area then positioned behind the rear ends 21a and 22a of the light pipes, provided the position of the viewfinder mask is such as to permit light to pass into the front ends of one or both light pipes, as explained elsewhere herein. It will be seen that extension portions 23 and 24 of the viewfinder mask are located so as to lie between shutter element 20 and wall 10a when extended to the positions shown in FIGS. 3 and 4.

The plate constituting the masking element 12 has an extension section of narrow width 23 and a wider section 24. This plate is slidably mounted in the camera by means of pin and slot mountings shown at 24 and 25.

FIG. 2 shows the masking element 12 in the position for taking a pseudo panoramic picture. In this position, opening 16 is located over the viewfinder and the plate 12 is at its extreme right hand position such that light is permitted to enter both light pipes 21 and 22 when the movable shutter element 20 is opened for an exposure.

In FIG. 3 the plate 12 is positioned for a pseudo tele exposure and the narrow section 23 of the plate is positioned over lower light pipe 22 such that when the shutter 20 is opened, light is permitted to reach the film fiducial area through pipe 21 but not through pipe 22. The indicia thus provided on the film (central film frame in FIG. 5) identifies the position of the mask as being at the tele position.

In FIG. 4 the mask element 12 is at its extreme left hand position such that the wider section 26 of the plate blocks both light pipes when the camera shutter 20 is open for exposing the exposure frame. In this case no light reaches the fiducial area of that frame (see right-hand frame in FIG. 5).

Figure 5:
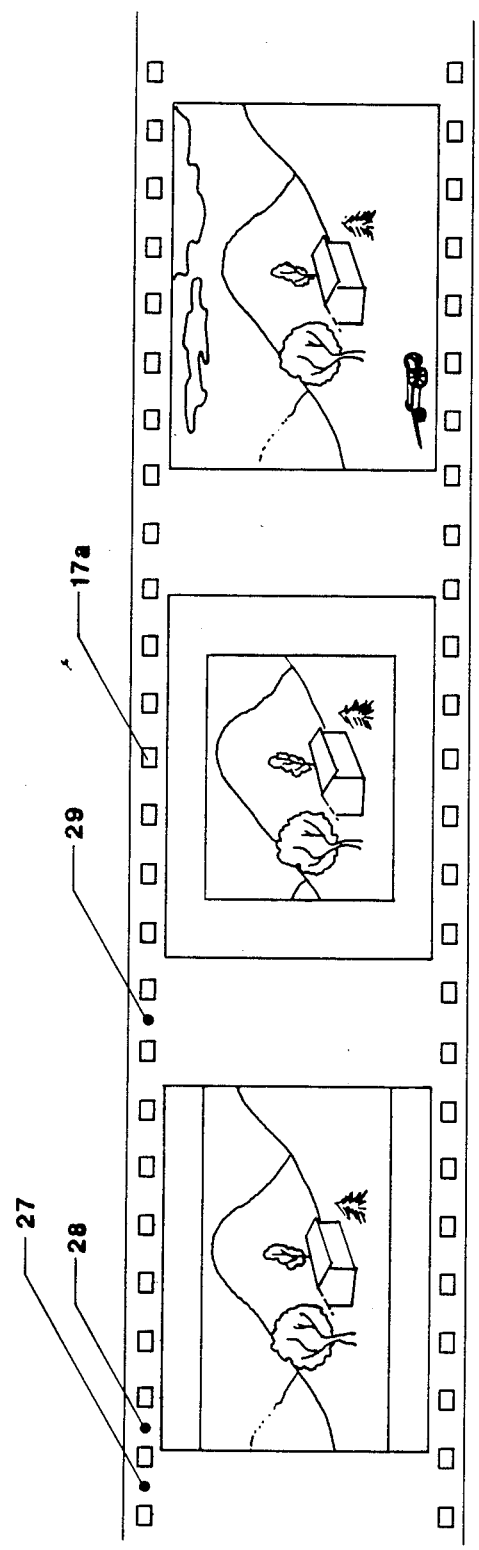
FIG. 5 shows an enlarged portion of a strip of film showing the binary code indicia on the film to identify the particular type of viewfinder framing.

FIGS. 2, 3 and 4 correspond to the particular exposure scenes shown at the left, at the center and at the right hand portion of FIG. 5, wherein the two exposures in the fiducial area by means of the light pipes are shown at 27 and 28, indicating pseudo panoramic photo. In the central frame of FIG. 5 only one light pipe has exposed the fiducial area as shown in 29, thus identifying a pseudo tele picture. In the extreme right hand frame of FIG. 5 both light pipes are blocked and the printer is thus told that a full frame (normal) print is to be made.

Light pipes are well known, being synthetic plastic elements which, by means of internal reflection, reflect light from one end to the other. They have been used in a number of ways in the photographic art and in other arts.

The invention has been described with reference to a preferred embodiment. However, it will be appreciated that variations and modifications can be effected within the ordinary skill in the art without departing from the scope of the invention.

I claim:

1. In a photographic camera for making pseudo photographs on film exposure areas upon opening of camera shutter means, said camera including adjustable view finder means for selecting from a range of pseudo fields of view for exposures, the combination comprising:

means for directing ambient light to a selected fiducial area of the film, means under the control of said viewfinder means for controlling ambient light passage by said directing means to provide a predetermined coded pattern of exposure of said fiducial area, and means blocking ambient light passage to said directing means except when the camera shutter is open.

2. The combination as set forth in claim 1, wherein said blocking means includes a movable element forming part of said shutter means.

3. The combination as set forth in claim 1, wherein said means for directing ambient light comprises light piping means.

4. The combination as set forth in claim 1, wherein said adjustable viewfinder means comprises a movable element having a plurality of differently shaped masking openings and an extension of varying width positioned so as to be movable to a plurality of positions as the viewfinder element moves, thereby to locate a portion of said extension in light blocking relation with the ambient light directing means.

5. In a photographic camera for making pseudo photographs on film exposure areas upon opening of camera shutter means, said camera including adjustable viewfinder means for selecting from a plurality of pseudo fields of view for exposures, the combination comprising:

light piping means for conveying ambient light to fiducial areas of the film.

a movable masking element comprising part of said adjustable viewfinder means, said masking element having a plurality of differently dimensioned masking openings and being movable to bring selected openings into alignment with the viewfinder, said masking element further having an extension which has portions of different dimensions and positioned in the camera to provide a varying degree of blocking of said light piping means, depending upon the particular masking opening aligned with the viewfinder, and an element forming part of said shutter means and positioned to block passage of ambient light to said fiducial area except when said shutter means is open.

6. The combination according to claim 5, wherein said light piping means comprises at least one light pipe having one end positioned to direct light to an edge of the film outside the image exposure area.

* * * * *